United States Patent [19]

Rudszinat

[11] 4,046,027

[45] Sept. 6, 1977

[54] APPARATUS FOR TRANSMITTING MOTION TO TOOLS IN CIGARETTE PACKING MACHINES OR THE LIKE

[75] Inventor: Willy Rudszinat, Dassendorf, Germany

[73] Assignee: Hauni-Werke Korber & Co. KG, Hamburg, Germany

[21] Appl. No.: 674,366

[22] Filed: Apr. 7, 1976

[30] Foreign Application Priority Data

Apr. 29, 1975 Germany ............................ 2519030

[51] Int. Cl.[2] ............................................. F16H 53/00

[52] U.S. Cl. ....................................... 74/567; 74/436; 74/25

[58] Field of Search ..................... 74/436, 25, 63, 567; 53/234

[56] References Cited

U.S. PATENT DOCUMENTS

| | | | |
|---|---|---|---|
| 788,494 | 4/1905 | Placer | 53/23 A |
| 3,572,143 | 3/1971 | Van Riemsdijk | 74/436 |
| 3,572,299 | 3/1971 | Lester | 74/567 |
| 3,606,526 | 9/1971 | Smith et al. | 74/436 |

FOREIGN PATENT DOCUMENTS

| | | | |
|---|---|---|---|
| 352,729 | 3/1961 | Switzerland | 74/436 |

*Primary Examiner*—Samuel Scott
*Assistant Examiner*—Wesley S. Ratliff, Jr.
*Attorney, Agent, or Firm*—Peter K. Kontler

[57] ABSTRACT

A cigarette packing machine wherein one or more indexible turrets for portions of or entire cigarette packs and the tools which treat the portions of or entire packs receive motion from a transmission having an input element which is a main drive shaft, several additional driving components in the form of shafts and/or gears receiving motion from the main drive shaft, several driven components which receive motion from the driving components and transmit motion to the tools and/or turret or turrets, and couplings which connect one or more driving components with associated driven components and/or the driven components with the associated turret or turrets and associated tools. The couplings include prefabricated flats provided on the driving and driven components, turret or turrets, and tools; such flats abut against each other to maintain the components, turret or turrets and tools in predetermined positions relative to each other.

10 Claims, 2 Drawing Figures

1
2
3
4
5
6
7
8
8a
9
11
12
13
14
14a
16
16a
16b
17
18
19
21
22
23
24
24a
26
27
F

APPARATUS FOR TRANSMITTING MOTION TO TOOLS IN CIGARETTE PACKING MACHINES OR THE LIKE

BACKGROUND OF THE INVENTION

The present invention relates to improvements in apparatus for transmitting motion from driving to driven components in transmission systems and/or other units of machine tools. More particularly, the invention relates to improvements in apparatus for transmitting motion to tools or the like in machines for the processing of tobacco, especially in packing machines for cigarettes or other smokers' products.

In a cigarette packing machine, the tools which fold, crease, tuck and/or otherwise manipulate or treat blanks, partly finished packs and/or finished packs for smokers' products perform a number of different movements. Such movements include reciprocatory, oscillatory, rotary, pure translatory and/or other movements. As a rule, all moving components derive motion from a main drive shaft which, in turn, receives motion from the output element of a prime mover. The movements of all, or nearly all, driven components must be synchronized with a high degree of accuracy and reproducibility. This will be readily appreciated by taking into consideration the delicate nature of cigarette packs, their parts and their contents. The blanks which are to form parts of packs are often draped around arrays of cigarettes so that such blanks must be folded gently in order to avoid damage to the contents. In many instances, a cigarette pack consists of at least three parts, namely an inner envelope which is made of metallic foil, an outer envelope which consists of soft paper or relatively lightweight cardboard (depending upon whether the pack is a soft pack or a so-called flip-top or hinged-lid pack), and a revenue label which is applied over one end of the outer envelope. Furthermore, many packs include third or outermost envelopes consisting of transparent synthetic plastic material and provided with customary tear strips. The parts of such packs must be assembled with a high degree of accuracy because even minor shifting of one blank with respect to the other blank or blanks necessitates segregation of the respective pack from satisfactory packs. Such high degree of accuracy must be achieved while the packing machine turns out up to and in excess of 400 commodities per minute.

Packing machines for cigarettes embody a substantial number of tools including levers, arms, blades, projections and/or others which are operated in synchronism and the driving components for which receive motion from the main drive shaft. The tools and/or the actuating elements therefor receive motion from the main drive shaft through the intermediary of gear trans, linkages, chain drives, belt drives and/or a combination of these. In a modern cigarette packing machine, the actuating elements for blank folding, tucking, creasing, coating or other tools normally include disk-shaped, cylindrical and/or otherwise configurated cams.

At the present time, the nature of transmissions, components of transmissions and tools which manipulate the blanks in a packing machine is determined in advance. However, the exact relationship between the driven and driving components is finalized during actual assembly of the machine. For example, the angular positions of cams with respect to shafts which transmit torque thereto, between the shafts and driving gears therefor as well as between the gears and the main drive shaft are normally determined during actual assembly and testing of the machine. Such mode of coupling the driving and driven components to each other is considered desirable and necessary in order to make sure that the movements of all driven components will be properly coordinated for the making of high-quality packs. The final attachment of driven components to associated driving components is performed by resorting to upsetting or an analogous technique. It is also known to resort to clamps and similar coupling devices which are designed to hold two or more separably connected components in a predetermined position with respect to each other.

The just described presently preferred procedure in assembling transmissions and other units of cigarette packing and like machines exhibits a number of serious drawbacks. First of all, the final assembly of the machine takes up a substantial amount of time because the person or persons in charge must couple a large number of driven components with associated driving components. Thus, each and every tool which is to deform and/or otherwise treat a blank in order to convert it into a part of a cigarette pack must be fixed to the corresponding motion transmitting element or elements in a separate step, often by resorting to special tools. Secondly, it was considered advisable to avoid the making of more or less permanent connections between driving and driven components in order to allow for rapid separation and replacement of defective components. However, it has been found that the heretofore known couplings cannot be reassembled with a desired degree of accuracy after a driven component has been temporarily detached from the associated motion transmitting component. Therefore, renewed mounting of temporarily detached components invariably necessitates lengthy experimentation in order to insure proper synchronization with movements of components which were not separated from the machine. For example, when a driven component is secured to a shaft by upsetting, the deformation must be eliminated (at least to a certain extent) if the driven component is to be detached from the shaft. Consequently, when such driven component is to be reattached to the shaft, it is difficult to find the exact angular position which is best suited to insure proper cooperation of the driven component with other component or components of the machine.

SUMMARY OF THE INVENTION

An object of the invention is to provide a transmission, particularly for use in packing machines for cigarettes or the like, which is designed to allow for rapid, convenient and reproducible assembly of its components without resorting to special tools or other auxiliary equipment.

Another object of the invention is to provide novel and improved couplings between the motion transmitting and motion receiving components of the transmission.

A further object of the invention is to provide simple, inexpensive and durable couplings between shafts, turrets, gears, pulleys, cams or analogous components of the transmission in a cigarette packing machine.

An additional object of the invention is to provide coupling means which allows for rapid detachment of tools from and for reproducible attachment of tools to associated motion transmitting components in packing machines for cigarettes or the like.

Another object of the invention is to provide novel and improved couplings between rotary cams and associated torque transmitting components in the transmissions of packing machines for cigarettes or the like.

The invention is embodied in a machine for the processing of smokers' products, especically in a packing machine for cigarettes or the like. The machine comprises a transmission having a plurality of driving components (which may include a main drive shaft and one or more shafts and/or gears which receive torque from the main drive shaft), a plurality of driven components (e.g., shafts and/or gears) which receive motion from the driving components, a plurality of product-treating components (such as cams and levers, links, springs, arms and/or a combination of these) which receive motion from the driven components, first coupling means between at least one product-treating component and the associated driven component, and second coupling means between at least one driven component and the associated driving component.

In accordance with a feature of the invention, at least one of the coupling means has prefabricated portions provided on and preferably integral with the respective components. The prefabricated portions cooperate with (e.g., abut against) each other to maintain the respective components in predetermined positions with respect to each other so that such positions are fixed as soon as the portions of a coupling means are assembled with each other. This can take place prior to assembly of the transmission.

The cooperating portions preferably have non-circular surfaces (e.g., flats) which abut against each other in properly assembled condition of the respective coupling means.

The novel features which are considered as characteristic of the invention are set forth in particular in the appended claims. The improved transmission itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figures 1, 2:
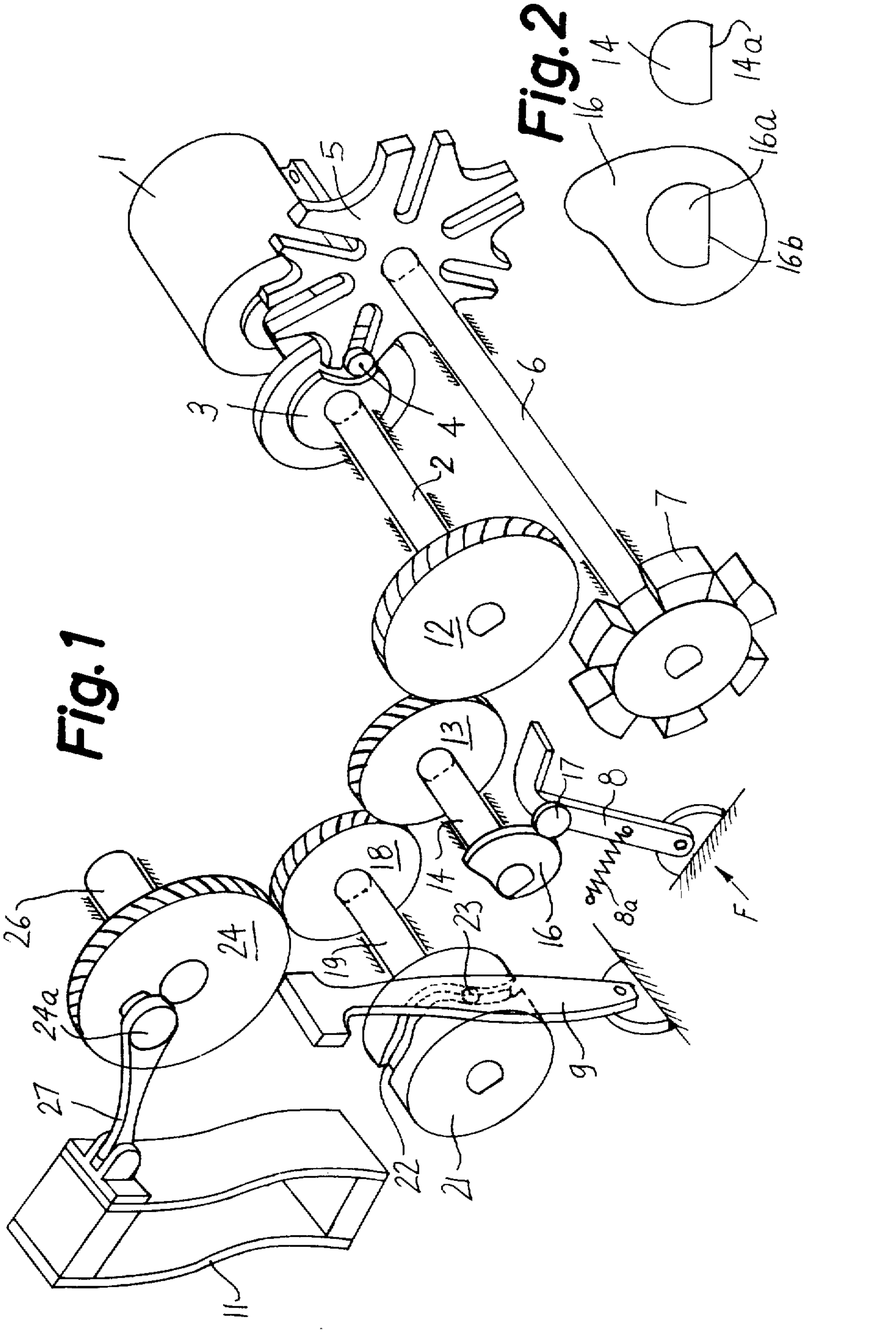
FIG. 1 is a schematic perspective view of a transmission in a cigarette packing machine which embodies one form of the invention.
FIG. 2 is an end elevational view of a shaft and a side elevational view of the associated cam in the transmission of FIG. 1.

The transmission of FIG. 1 receives motion from a prime mover 1 (e.g., a variable-speed electric motor). The motor 1 rotates a main drive shaft 2 which constitutes the input element of a transmission and carries a disk-shaped cam 3 having a projection 4 which cooperates with a geneva wheel 5 mounted on a shaft 6. The main drive shaft 2 rotates at a constant speed whereby the projection 4 causes the shaft 6 to perform intermittent movements which are transmitted to the schematically illustrated turret 7 of a cigarette packing machine. The turret 7 carries and transports portions of or entire cigarette packs (not shown) which are treated by several tools including those shown at 8, 9 and 11. The arrangement is preferably such that the tool 8, 9 and/or 11 treats the part or parts of or an entire pack on the turret 7 while the shaft 6 is at a standstill.

The tool 8 is a pivotable lever which is mounted in the frame F of the packing machine and is biased in a counterclockwise direction, as viewed in FIG. 1, by a helical spring 8*a*. The means for pivoting the tool 8 at predetermined intervals comprises a gear train including spur gears or herringbone gears 12, 13, a shaft 14 which is driven by the gear 13, a disk-shaped cam 16 or an analogous actuating element on the shaft 14, and a roller follower 17 mounted on the tool 8. The gear 12 is rigid with the main drive shaft 2. The spring 8*a* insures that the follower 17 invariably tracks the periphery of the cam 16.

The tool 9 constitutes a second pivotable lever which is mounted in the machine frame F and receives motion from a second actuating element here shown as a cylinder cam 21. The cam 21 is rigid with a shaft 19 which receives torque from a gear 18 in mesh with the gear 13 on the shaft 14. The cam 21 has an endless circumferential groove 22 for a follower 23 which is mounted on an intermediate portion of the tool 9. It will be noted that the pivot axis of the tool 9 is normal or substantially normal to the pivot axis of the tool 8.

The tool 11 is an elastic component which receives motion from an actuating element in the form of a connecting rod 27 articulately connected with the tool 11 and with an eccentric pin 24*a* on a gear 24 in mesh with the gear 18. The gear 24 is mounted on a shaft 26. When the main drive shaft 2 is rotated by the motor 1, the gear train 12, 13, 18, 24 causes the actuating element 27 to impart to the tool 11 oscillatory movements at a predetermined frequency. The manner in which the tools 8, 9 and 11 treat portions of or entire packs on the turret 7 of the packing machine forms no part of the present invention. Reference may be had to commonly owned U.S. Patent No. 3,735,767 granted May 29, 1973 to Kruse et al.

The actuating elements 16, 21 and 27 for the tools 8, 9 and 11 must be mounted in predetermined positions with respect to the associated shafts 14, 19 and 26, with respect to each other, with respect to the turret 7, and with respect to several other components of the machine. In accordance with a feature of the invention, such mounting is achieved by providing simple and inexpensive coupling means including first portions on the shafts 14, 19 and 26 and second portions on the associated actuating elements 16, 21 and 24, 26. The coupling means include cooperating flats on the shafts and on the respective actuating elements.

Similar or analogous coupling means are preferably also provided on the shafts 14, 19 and the associated torque-transmitting or driving components (gears 13 and 18). Still further, similar or analogous coupling means are preferably provided on the shafts 2, 14 and the associated gears 12, 13, between the main drive shaft 2 and the cam 3, between the geneva wheel 5 and the shaft 6, as well as between the shaft 6 and the turret 7.

One of the improved coupling means is illustrated in detail in FIG. 2. The shaft 14 for the cam 16 has a flat 14*a*, and the cam 16 has a complementary bore 16*a* a portion of which is bounded by a flat 16*b* which is adjacent to and abuts against the flat 14*a* when the cam 16 is properly mounted on the respective end portion of the shaft 14. When the driving and driven components 14, 16 are properly coupled to each other, the cam assumes a predetermined angular position with respect to the shaft.

The turret 7 can be said to constitute a product-treating (indexing) component and the shaft 6 can be said to constitute the associated driven component which transmits motion to (indexes) the turret. Analogously, the lever 8, its follower 17 and the cam 16 constitute another product-treating component which receives motion from the driven component or shaft 14. The same applies for the product-treating component 9, 23, 21 or 11, 27, 24 and the associated driven component 18. The wheel 5 is a driving component for the driven component or shaft 6, the shaft 2 is a driving component for the driven components 3, 12, the gear 13 is a driving component for the driven component or shaft 14, and so forth. Each of the driving components and the associated driven component(s) can be connected to each other by one of the improved coupling means. Also, each of the product-treating components can be connected with the associated driven component by one of the coupling means.

It is clear that the coupling means of FIG. 2 constitutes but one of a large number of devices which can be utilized in accordance with the present invention. For example, the flat 14*a* of FIG. 2 can be replaced with a concave or convex (non-circular) surface which is complementary to a convex or concave surface in the bore of the associated cam 16. Moreover, the shaft 14 can have two or more flats and the surface surrounding the bore of the cam 16 then includes an equal number of complementary flats.

The parts or portions of the improved coupling means are prefabricated, i.e., they are machined onto or into the corresponding driving and driven components of the transmission during manufacture of such components. This simplifies the assembly of transmission since each component can be mounted on or can support the associated driving or driven component in a single predetermined position which is the optimum position for insuring that the packing machine will operate properly. Additional advantages arise when the components of the transmission must be taken apart and reassembled. Thus, each temporarily separated component can be mounted on the associated component in a single predetermined position. This insures that the replacement of a component takes up a minimum of time. In other words, whenever a used or damaged component is to be replaced, the mounting of a new component requires no adjustment of the transmission. Furthermore, the improved coupling means insure that the angular positions of components do not change while the packing machine is in operation, even after extended periods of use.

It is clear that the invention can be embodied in other units of cigarette packing machines or in other types of machines for the processing of tobacco. For example, the invention can be embodied in the unit which transmits motion from a first turret to one or more additional turrets of a packing machine. Also, the number of tools which treat packs or parts of packs on a given turret can be increased beyond or reduced to less than three. As a rule, the number of tools which cooperate with a turret greatly exceeds the illustrated number. Each group of two or more components which are assembled and configurated in accordance with the invention can be taken apart and reassembled as often as desired or necessary, with little loss in time, and always in such a way that the relative positions of reassembled components and the positions of such components with respect to all other components need not be adjusted because the improved couplings invariably insure that the relationship of components is best suited for satisfactory operation of the machine.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed is:

1. In a machine for the processing of smokers' products, particularly in a packing machine for cigarettes or the like, a transmission comprising a plurality of driving components; a plurality of driven components receiving motion from said driving components; a plurality of product-treating components receiving motion from said driven components; first coupling means between at least one of said product-treating components and the associated driven component; the second coupling means between at least one of said driven components and the associated driving component, each of said coupling means including separable and reassemblable prefabricated portions provided on and rigid with the respective components and cooperating with each other to maintain, without any adjustment, the respective components in identical predetermined positions relative to each other subsequent to initial and each renewed assembly of such cooperating portions.

2. A transmission as defined in claim 1, wherein the product-treating component of said first coupling means comprises a rotary cam and the associated driven component is a rotary member.

3. A transmission as defined in claim 1, wherein the product-treating component of said first coupling means comprises an oscillatable member and means for oscillating said member in response to movement of the associated driven component.

4. A transmission as defined in claim 1, wherein one of said product-treating components includes a carrier for smokers' products and the associated driven component includes means for moving said carrier stepwise.

5. A transmission as defined in claim 4, wherein said carrier is an indexible turret and said moving means comprises means for indexing said turret.

6. A transmission as defined in claim 1, wherein said portions of at least one of said coupling means include abutting non-circular surfaces on the respective components.

7. A transmission as defined in claim 6, wherein said surfaces include flats.

8. A transmission as defined in claim 1, wherein one of said driving components includes a shaft and all other components receive motion from said shaft.

9. A transmission as defined in claim 1, wherein at least one of said driving components is a gear and at least one of said driven components is a shaft.

10. A transmission as defined in claim 1, wherein said portions of each of said coupling means are integral with the respective components and permit attachment of the respective components to each other in a single position of such components relative to each other.

* * * * *